May 27, 1958  M. E. FRY  2,836,698
DOMESTIC APPLIANCE
Filed May 14, 1953

INVENTOR.
Millard E. Fry
BY R. R. Candor
His Attorney

United States Patent Office 2,836,698
Patented May 27, 1958

2,836,698

DOMESTIC APPLIANCE

Millard E. Fry, Dayton, Ohio, assignor to General Motors Corporation, Detroit, Mich., a corporation of Delaware Application May 14, 1953, Serial No. 354,952

4 Claims. (Cl. 219—37)

This invention relates to a domestic appliance and more particularly to electric heaters of the sheathed type.

In the use of electric heaters there are a number of applications in which the heat output can be usefully used only on one side of the heater. Some examples are the surface heaters, deep-well cookers and the broil heaters of electric ranges. At present it is customary to provide heating elements having a uniform surface finish which will radiate heat equally in opposite directions.

It is an object of my invention to provide a heating arrangement which will direct the major portion of the heat in one direction.

It is another object of my invention to provide a heating arrangement which will radiate heat in substantially parallel paths.

It is another object of my invention to provide a sheathed electric heater with a durable coating having low emissivity upon the surface on one side to reduce radiation from that side.

It is another object of my invention to provide a heating and reflecting arrangement in which the heating element is provided with a surface having a low emissivity on the side opposite the reflector to obtain maximum reflected heat from the reflector.

These and other objects are attained by providing in Figures 1 and 2 a surface heating unit having a high emissivity flat heating surface on its upper side and a low emissivity surface finish such as slag enamel, silver or a silver coating on a slag enamel coating to provide low emissivity on the side of the unit. In Figure 3 the sheathed heating unit is provided with a similar low emissivity surface on its bottom side and a high emissivity surface on its upper side. Above it there is provided a parabolic reflector which directs the radiant heat from the upper radiant surface directly downwardly for broiling or other purposes.

Further objects and advantages of the present invention will be apparent from the following description, reference being had to the accompanying drawings wherein a preferred form of the invention is clearly shown.

Figure 1:
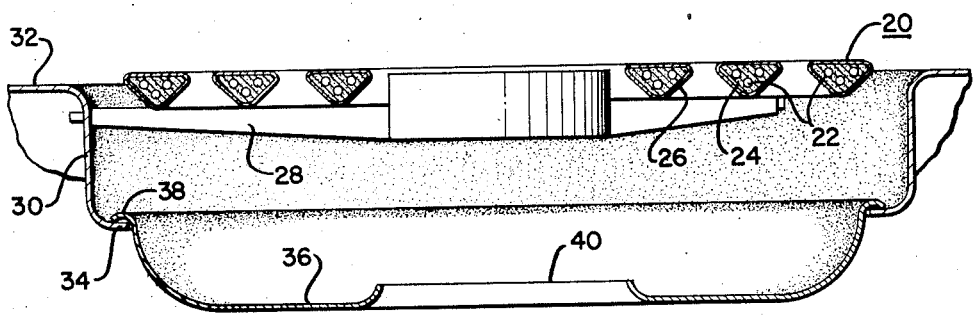
Figure 1 is a vertical sectional view through a surface heating unit embodying one form of my invention.

Referring now to the drawings and more particularly to Figure 1 there is shown a sheathed tubular heating element 20 having a substantially flat high emissivity upper surface. This heating element 20 preferably contains the electrical resistance 22 embedded in electrical insulating material 24 such as compacted magnesium oxide. This compacted insulating material 24 is enclosed in a sheath 26 of stainless steel or other suitable material capable of withstanding the temperatures involved. This heating element 20 is preferably supported upon a multi-armed support 28. The outer ends of the arms of the support 28 are supported by the turned down flange 30 of the top 32 of a domestic electric range. Supported beneath the heating element 20 and the support 28 upon a second flange or ledge 34 is a combined drip pan and reflector 36 having its rim 38 supported upon the flange or ledge 34 as shown in Figure 1.

The primary purpose of such a surface heating unit is to heat a cooking vessel resting upon the top surface of the heating element 20. Therefore it is desirable that all of the heat generated in the heating element 20 be transmitted to such a vessel. However, a considerable portion of the heat is radiated downwardly onto the drip pan and reflector 36. Some of this heat may pass through the central opening 40 which is provided as an overflow for the pan 36. Some of this heat may be absorbed by the reflector 36 and the flange 30 while the remainder will be reflected back toward the cooking vessel.

According to the present invention the downward heat radiations are reduced by providing a surface finish 42 of low emissivity on all except the top surface of the heating element 20. Preferably this surface finish is formed by any form of finish which will retain its brightness and low emissivity under operating temperatures. One form of finish is to silver plate the lower surfaces of the heating element 20. Another suitable finish is to coat these surfaces with a low emissivity slag enamel. A third satisfactory finish is to provide such a coating of slag enamel and to provide a silver coating upon the surface of the slag enamel. Each of these surface finishes will reduce the downward radiation which will materially reduce or eliminate the wasting of considerable heat in the detrimental heating of portions of the electric range beneath the heating element 20. In this way efficiency will be increased.

Figure 3:
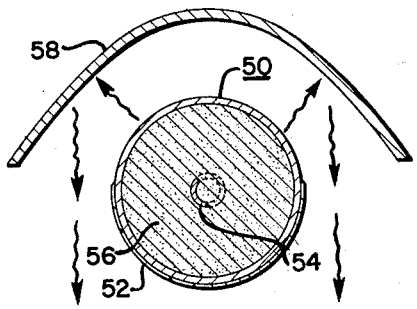
Figure 3 is an enlarged sectional view through a portion of a broil heater and reflector arrangement.

In Figure 3 there is shown an arrangement for a broil unit to direct the radiant heat directly downward. This is accomplished by providing a sheathed tubular heating element 50 with a surface finish 52 of low emissivity on all of its lower surface. The heating element 50 contains an electrical resistance 54 embedded in the electrical insulation 56 which may be compact magnesium oxide. This electrical insulation 56 is enclosed in a sheath of stainless steel or other suitable material. Above the heating element 50 is a concave reflector 58 preferably of the parabolic type so that the radiant heat emitted from the upper surface of the heating unit 50 will be focused directly down.

Figure 2:
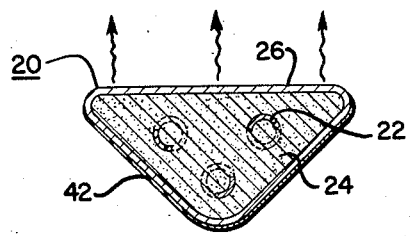
Figure 2 is an enlarged sectional view through the tubular sheath shown in Figure 1.

To do this, the heating element 50 has its center point located substantially in coincidence with the focal point of the parabolic reflector 58. The lower edges of the parabolic reflector 58 extend far enough down to reflect any rays emitted from the upper emitting surface of the heating element 50. The remaining surface of the heating element 50 is provided with the surface finish 52 of low emissivity. This surface may be of any of the types mentioned in connection with the low emissivity surface 42 in the description of Figures 1 and 2. Through this arrangement the radial heat will be directed in parallel paths downwardly onto the surface of the meat to be broiled so that greater penetration and faster broiling is obtained. More uniform broiling over the surface of the meat can also be expected.

Though in both examples the use of the low emissivity surface on the side opposite the radial surface and the use of concave reflectors cause the heat to be directed in the direction desired with less waste.

In accordance with the provisions of Rule 78a, reference is made to the following prior filed application, S. N. 171,096, now Patent No. 2,719,906.

While the form of embodiment of the invention as herein disclosed constitutes a preferred form, it is to be

What is claimed is as follows:

1. An electric surface heater including a sheathed tubular heating unit having an electrical resistance embedded in solid electrical insulation enclosed in a metal sheath, said sheath having a top surface for supporting a cooking vessel, the bottom surfaces of said sheath being provided with an external coating of a low emissivity slag enamel.

2. An electric surface heater including a sheathed tubular heating unit having an electrical resistance embedded in electrical insulation enclosed in a metal sheath, said sheath having a top surface for supporting a cooking vessel, the bottom surfaces of said sheath being provided with an external coating of a low emissivity slag enamel having thereon a surface coating of silver.

3. An electric heater including an outer metal sheath, a solid electrical insulating material sealed within the sheath, an electrical resistance embedded within said insulating material, the outer surface on one side of said sheath being provided with a low emissivity slag enamel coating, and a silver coating upon the surface of the slag enamel coating.

4. An electric surface heater including a sheathed tubular heating unit having an outer sheath containing solid electrical insulating material and an electrical resistance unit embedded in said insulating material, said sheath being provided with a top surface for supporting a cooking vessel, a reflector beneath said sheath with an air space between the sheath and the reflector, the bottom surface of said sheath being provided with an external coating of a low emissivity slag enamel to reduce the radiation into said air space, said slag enamel coating being provided with an external silver coating.

References Cited in the file of this patent

UNITED STATES PATENTS

| | | |
|---|---|---|
| 606,792 | Quidas | July 5, 1898 |
| 1,531,308 | Rice et al. | Mar. 31, 1925 |
| 1,721,099 | Wiegand | July 16, 1929 |
| 2,361,874 | Russell | Oct. 31, 1944 |
| 2,375,369 | Knight et al. | May 8, 1945 |
| 2,658,984 | Mohn | Nov. 10, 1953 |